United States Patent [19]

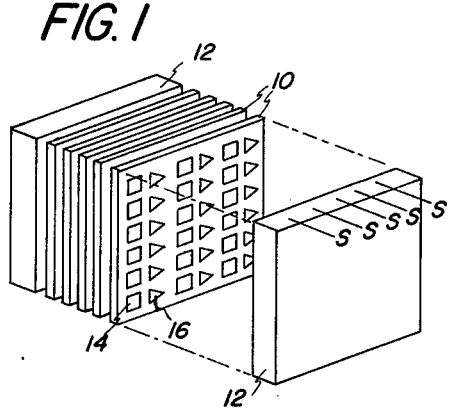
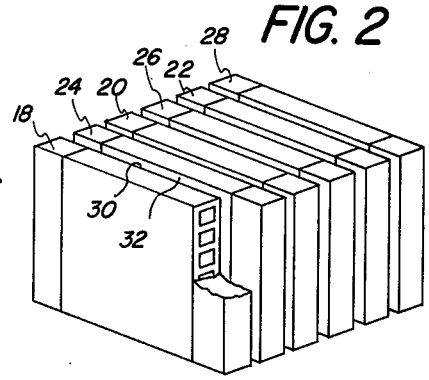
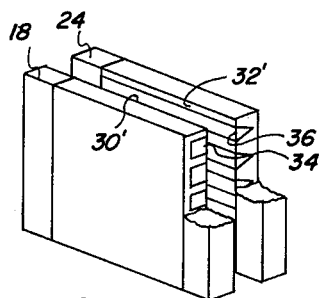
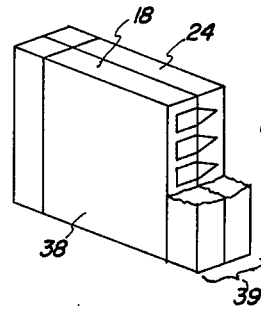
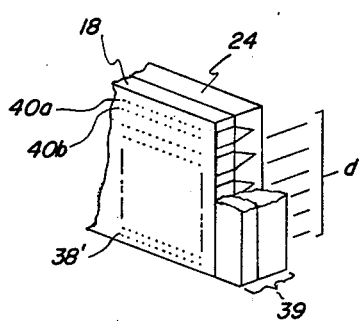
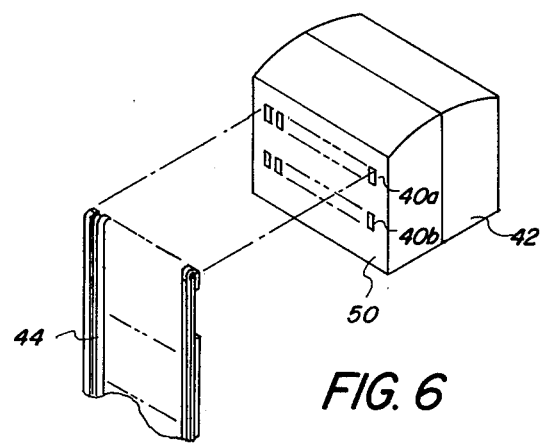

Griffith

[11] 4,158,213
[45] Jun. 12, 1979

[54] MULTITRACK MAGNETIC HEADS

[75] Inventor: Neil J. Griffith, San Diego, Calif.

[73] Assignee: Spin Physics, Inc., San Diego, Calif.

[21] Appl. No.: 916,652

[22] Filed: Jun. 19, 1978

[51] Int. Cl.² ............................ G11B 5/28; G11B 5/20
[52] U.S. Cl. .................................. 360/121; 360/120; 360/123; 360/125; 29/603
[58] Field of Search ................. 360/121, 119–120, 360/123–126; 29/603

[56] References Cited

U.S. PATENT DOCUMENTS

| Re. 29,326 | 7/1977 | Lazzari et al. | 360/123 |
| 3,344,237 | 9/1967 | Gregg | 360/126 |
| 3,549,825 | 12/1970 | Trimble | 360/123 |
| 3,564,522 | 2/1971 | Stevens, Jr. | 360/125 |
| 3,601,871 | 8/1971 | Pierce | 29/603 |
| 3,634,632 | 1/1972 | Watson | 360/121 |
| 3,648,264 | 3/1972 | Gruczelak et al. | 360/121 |
| 3,685,144 | 8/1972 | Trimble | 29/603 |
| 3,731,005 | 5/1973 | Shearman | 360/123 |
| 3,829,896 | 8/1974 | Brock et al. | 360/125 |
| 3,909,932 | 10/1975 | Kroon | 360/121 |
| 3,913,143 | 10/1975 | Schneider et al. | 360/121 |
| 3,986,210 | 10/1976 | Sugaya et al. | 360/123 |
| 3,987,488 | 10/1976 | Kanai et al. | 360/123 |
| 4,044,394 | 8/1977 | Hanazono et al. | 360/123 |

FOREIGN PATENT DOCUMENTS

| 1468368 | 3/1977 | United Kingdom | 360/121 |
| 1468551 | 3/1977 | United Kingdom | 360/125 |
| 1487234 | 9/1977 | United Kingdom | 360/126 |

Primary Examiner—Alfred H. Eddleman
Attorney, Agent, or Firm—Robert F. Cody

[57] ABSTRACT

High track density multitrack magnetic heads are batch-fabricated from a stack of wafers which are photolithographically processed to provide lands and grooves on the wafers. Thin magnetic films are deposited in the grooves; and coils respectively inductively cooperative with the films are photolithographically formed about the films, the lands serving both to provide track-to-track spacing and to protect the magnetic films from magnetostriction-producing stress.

13 Claims, 14 Drawing Figures

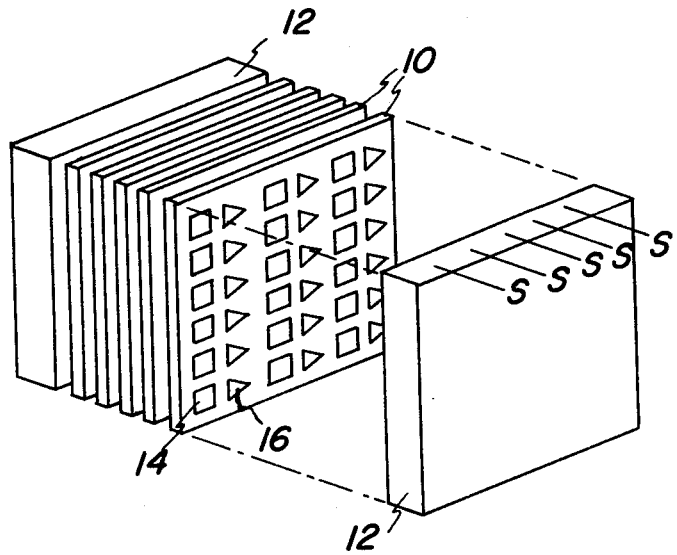

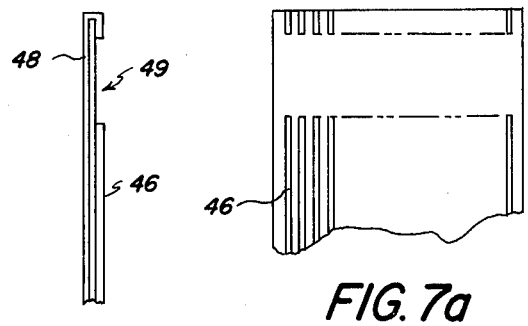
FIG. 7a
FIG. 7b
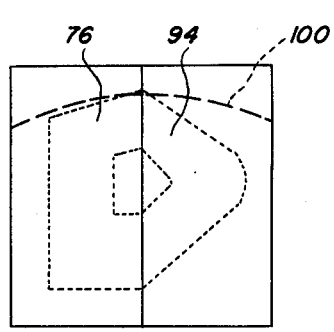
FIG. 10
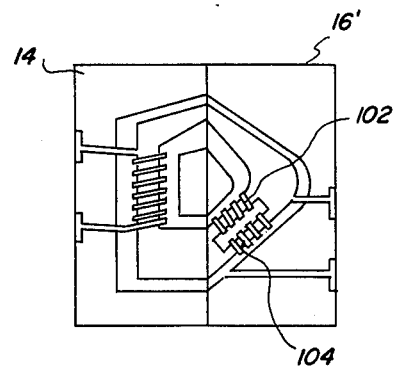
FIG. 11
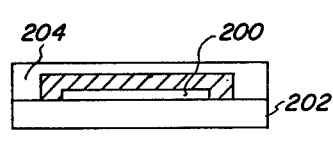
FIG. 12
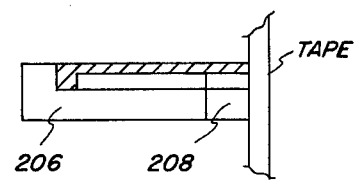
FIG. 13

MULTITRACK MAGNETIC HEADS

BACKGROUND OF THE INVENTION

1. Field of the Invention

This invention relates in general to magnetic heads and in particular to a multitrack head having an extremely high density of discrete heads (channels) per inch across the face thereof.

The invention also relates to a process for making such multitrack heads.

2. Description Relative to the Prior Art

High density magnetic recording as employed, for example, in connection with the recording of video information is usually done by means of a single-track head which traverses, and coacts at high speeds with, a magnetic tape. Examples of apparatus capable of such recording are quadruplex and helical scan video recorders.

It has long been desired to obviate the need for high relative head-to-tape speed by use of a stationary multitrack magnetic head, whereby each "line" of image signals is simultaneously recorded in parallel on a relatively slow moving tape. Multitrack magnetic heads capable of recording, say, 400 tracks across the one inch width of typical magnetic tape have, to date, been beyond the state of the art. Not only is "track density" a formidable problem, but precise track dimensioning and precise (and uniform) track-to-track spacing are demanding considerations. Indeed, a multitrack head capable of recording 400 tracks per widthwise inch of tape would require that the track-to-track spacing be a mere 0.0025 inches; and given a guard band between tracks, a typical track width would be about 0.0004 to 0.001 inches.

Putting additional stress on the demanding considerations indicated above is the matter of cost. Whereas it might, perhaps, be possible to assemble (tediously) the parts necessary to make a multitrack head of the type under discussion, it is another matter to make multitrack heads, in a high yield process, at low cost. This means that batch fabrication of multitrack heads is a must; and corollarily head design must be such as to be susceptible to batch fabrication.

Consider further that even discrete head of a multitrack head has a coil associated with it; and that each coil has a pair of cooperating leads for connection to a signal processing circuit: This means, for the 400 track head under discussion 800 leads packed across the one inch width of the head. Needless to say, this is a demanding concern and, attendantly, the head should be of such a design that lead connections to the head can be made easily. Corollarily, the above mentioned batch fabrication process must be one which permits such design.

Representative prior art which may be relevant to the present invention may be found in the following U.S. Pat. Nos.: 3,344,237, issued Sept. 26, 1967 to Gregg; 3,564,522, issued Feb. 16, 1971 to Stevens, Jr.; 3,601,871, issued Aug. 31, 1971 to Pierce; 3,731,005, issued May 1, 1973 to Shearman; 3,986,210, issued Oct. 12, 1976 to Sugaya et al; Re. 29,326, reissued July 26, 1977 to Lazzari et al; 3,893,189, issued July 1, 1975, to Kroon; and 3,983,122, issued Oct. 6, 1976 to Schneider et al.

SUMMARY OF THE INVENTION

The present invention is implemented by means of a wafer stacking technique: Each wafer comprises the parts of several discrete heads, say eighteen. The wafers are bonded together; diced; and then processed as generally done in the art to produce eighteen multitrack heads.

The discrete head parts of the wafers embody a land-and-groove concept which is implemented by conventional photolithography, the lands of any given head serving both to provide precise (and uniform) track-to-track spacing, and also to cradle the active magnetic parts of that head within the groove associated with the lands. By so cradling the magnetic parts, such parts are not subject to magnetostriction, which can result in the discrete heads of a multitrack head having different performance characteristics.

Additional features of heads according to the invention, as well as the process for forming such heads, will be discussed in connection with the Figures, of which:

FIG. 1 is a perspective exploded view of a stack of wafers arranged to practice the invention;

FIG. 2 is a perspective view of sections formed from the wafer stack depicted in FIG. 1;

FIGS. 3, 4 and 5 are perspective views, partially cut away, illustrating successive steps in the manufacture of multitrack heads according to the invention;

FIG. 6 is a perspective exploded view illustrating a multitrack head embodying the invention;

FIGS. 7a and 7b are plan and side views, respectively, of a connector adapted for use with the head depicted in FIG. 6;

FIG. 10 is an end view illustrating the contoured shape of a multitrack head embodying the invention; and FIGS. 11, 12 and 13 depict alternative heads embodying the invention.

Figure 8:
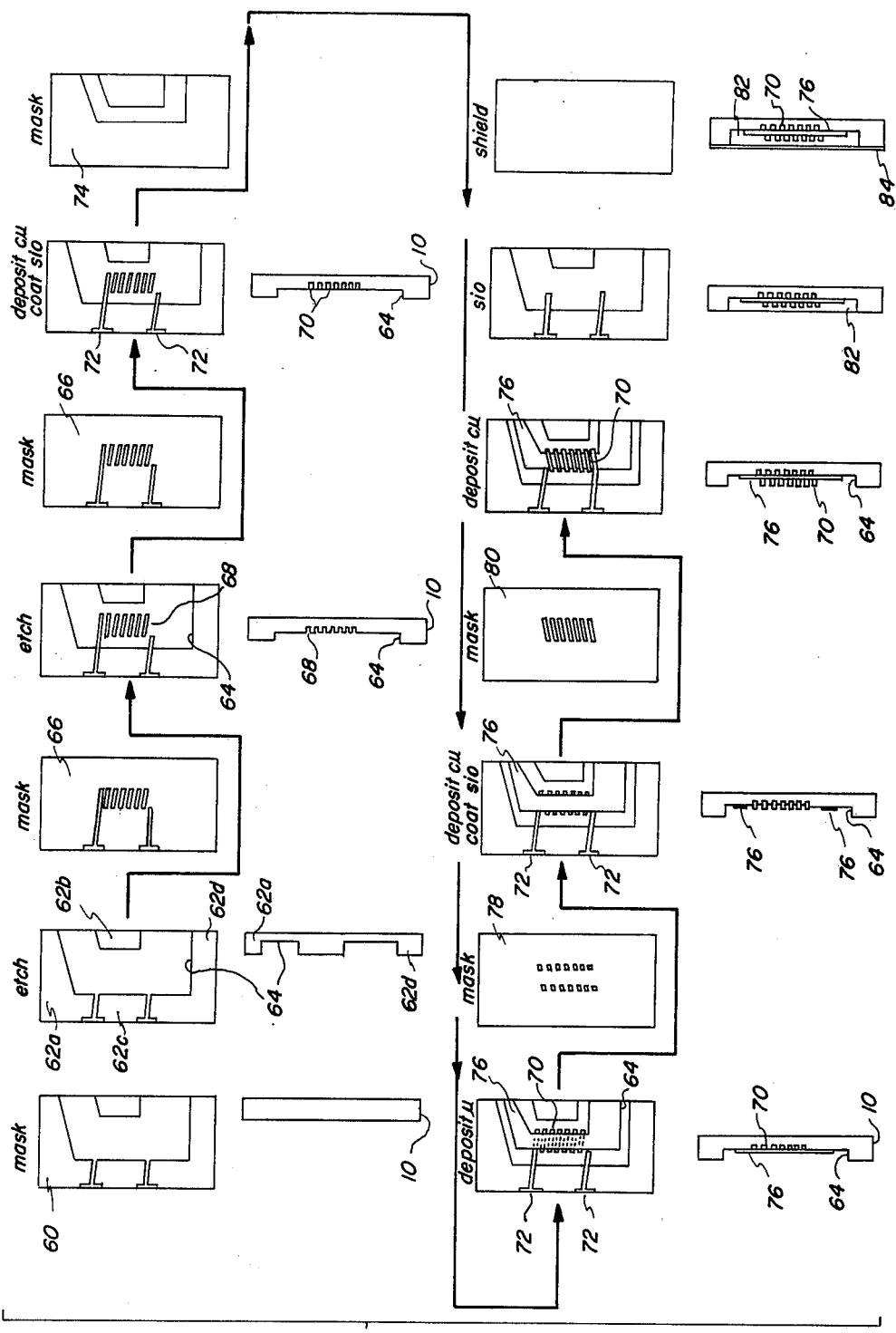
FIG. 8 depicts the successive steps employed to fabricate one pole piece embodying the invention.

Addressing first the batch fabrication aspect of the invention, reference should be had to FIG. 1 which shows a stack of identical wafers 10 arranged between end plates 12. Each wafer (wafers typically are one inch square and lapped to about 0.0025 inches thick) supports the parts 14, 16 for eighteen multitrack heads. The parts 14, as will appear below, are coil-supporting core halves; and the parts 16 are core halves for completing the magnetic circuits associated with the core halves 14. The wafers 10, which are of equal and uniform thickness, are ceramic (e.g., forsterite; or Fotoceram—available from Corning Glass Corp., Corning, New York—etc.), although other suitable non-magnetic materials could be used. After stacking, the wafers 10 and end plates 12 are bonded together, e.g. by epoxy, into the form of a block. The block is then sliced along five slice lines S to form the six pieces depicted in FIG. 2.

Of the six pieces in FIG. 2, three (18, 20, 22) contain core halves 14, and three (24, 26, 28) contain core halves 16. Taking appropriatly paired pieces (e.g. the pieces 18, 24), the respective faces (30, 32) of such pieces are lapped to reveal magnetic pole pieces (34, 36) emanating from the lapped faces 30', 32'. See FIG. 3.

After depositing a gapping material, e.g. SiO, over one or both faces 30', 32', the pieces 18, 24 are brought into face-to-face abutting contact and bonded together (e.g. by epoxy) to form a stack 39 for forming six multitrack heads. See FIG. 4.

Next, the face 38 of the stack 39 is lapped to reveal contacts 40a, 40b (FIG. 5) for lead connections to the coils associated with the core halves 14... this feature to be described in greater detail later. Then, the stack 39 is diced along lines d (FIG. 5) into six multitrack heads, which are thereafter contoured into multitrack heads (42) as depicted in FIG. 6.

(In like manner the paired pieces 20, 26 and 22, 28 are similarly processed into twelve additional multitrack heads for a total of eighteen multitrack heads.)

Electrical connection is made to the exposed contacts 40a, 40b of the multitrack head 42 by means of a connector 44. The connector 44 has conductor leads 46, 48 photoetched out of conductive coatings on opposite faces of a strip of plastic, the leads 48 extending to the same strip face 49 that supports the leads 46. Thus, since the contacts 40a and 40b are on the same side 50 of the head 42, connection to the (800) contacts of the discrete heads which form the multitrack head 42 may be easily, and simultaneously, made by properly aligning and bringing the connector face 49 into bonding contact against the head side 50.

Figure 9:
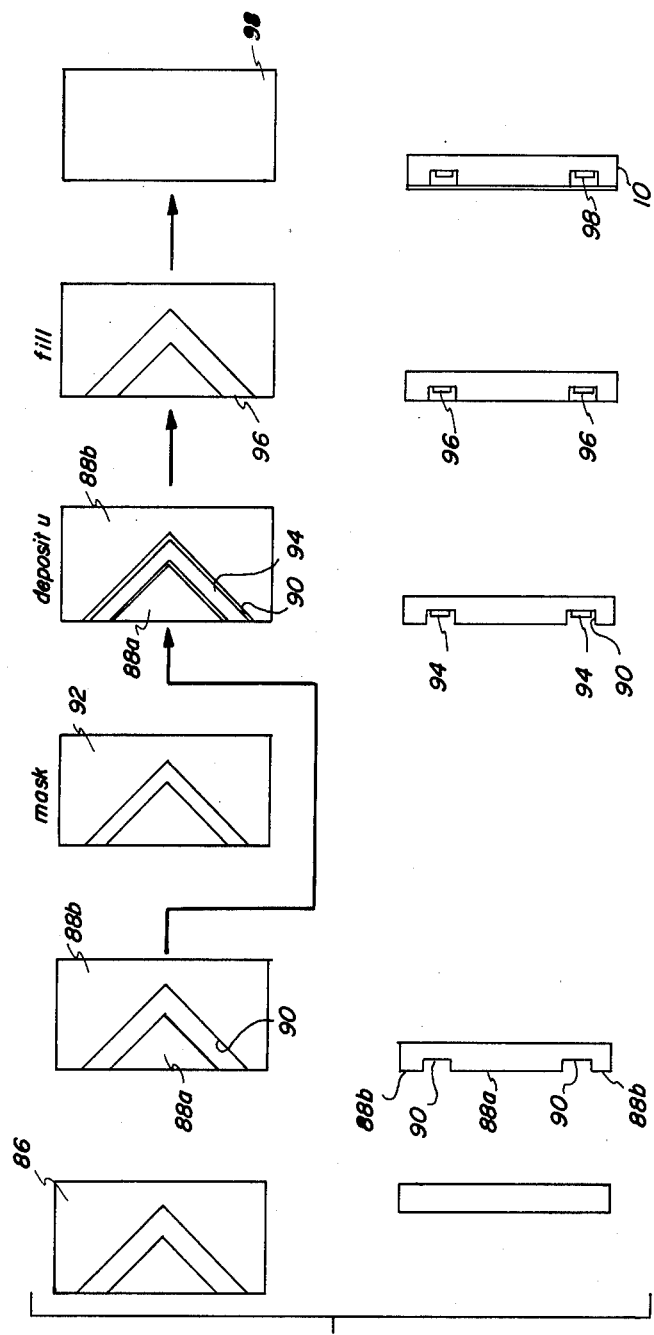
FIG. 9 depicts the successive steps employed to form a second pole piece for use in a multitrack head according to the invention.

Bearing in mind that all of the core halves 14, 16 on a given wafer 10 are simultaneously formed, one each of the core halves 14, 16 (and their modes of fabrication) will now be described in detail with respect to FIGS. 8 and 9

CORE HALF 14 (FIG. 8)

Starting with a raw wafer 10, and using conventional photolithography, the mask 60 of a core half 14 is formed over the wafer 10. After etching through the mask windows, lands 62a, b, c, d, and a groove 64, are formed. Again using photolithography, a mask 66 is formed over the wafer 10; and thereafter, by etching through the windows of the mask 66, cross-grooves 68 for forming a coil are etched within the groove 64. Then, without removing the (photoresist) mask 66, the etching process is halted (e.g. by rinsing the wafer in distilled water), after which copper or aluminum is deposited through the windows of the mask 66 to fill (70) the coil cross-grooves 68, as well as lead grooves 72.

Next, a mask 74 for defining the shape of the magnetic pole piece 76 of the core half 14 is photolithographically formed on the wafer 10. The magnetic pole piece 76 is built by depositing, e.g. by sputtering or vacuum-depositing, an amorphous film of permalloy or the like through the window of the mask 74. In this regard, it is best to deposit, alternately, coatings of permalloy and insulating material (e.g. SiO) within the groove 64, thereby to reduce the tendency of the pole pieces 76 to form eddy currents therein.

With a photolithographically formed mask 78 covering the pole piece 76, copper or aluminum, as appropriate, is deposited through the mask 78 windows, thereby to ready the wafer 10 for completion of its coil 70. The mask 78 is removed, and replaced by a photolithographically produced mask 80. Copper or aluminum, as appropriate, is deposited through the mask 80 windows to complete the coil 70 wrapped about the pole piece 76.

Non-conductive, non-magnetic SiO 82 is then deposited over the whole processed face of the wafer 10, after which a thin film 84 of permalloy is (preferably) sputtered or vacuum-deposited over the SiO coating. The magnetic film 84 serves to isolate the pole piece 14 from other pieces when the wafer 10 is stacked with other wafers.

CORE HALF 16 (FIG. 9)

The core half 16 is created in a similar, but simpler, process than that used in connection with the core half 14: Starting with a wafer 10, a mask 86 is photolithographically formed over the wafer 10, etching through the mask window serving to form lands 88a and 88b, and a groove 90. A mask 92 is again formed over the wafer; and then permalloy or the like is sputtered or vacuum-deposited into the groove 90 through the window of the mask 92, thereby to form the pole piece 94 of the core half 16. A coating of SiO 96, as was the case with the core half 14, is applied to cover the magnetic pole piece 94; and then a thin magnetic coat 98 is (preferably) sputtered or vacuum-deposited over the whole processed surface of the wafer 10.

Referring now to FIG. 10, a discrete head is formed (as otherwise detailed above in connection with FIGS. 1–5) by bringing the pole pieces 76, 94 in abutting end-to-end contact; and then contouring along a contour line 100.

It will be appreciated that by virtue of the land-and-groove structure of the wafers 10 the primary track-to-track spacings are established (i.e. by the wafer lands) when such wafers are stacked to form multitrack heads. And, because the pole pieces 76, 94 reside totally within grooves, they cannot be subjected to stacking stress; and attendantly they are not subject to magnetostrictive effects either.

The invention has been described in detail with particular reference to certain preferred embodiments thereof, but it will be understood that variations and modifications can be effected within the spirit and scope of the invention. For example, although the invention is cast in the form of a head dependent on flux rate of change, a flux gate or similar type of head may employ the invention as well. FIG. 11 shows one such head in which the core half part(s) 14 is complemented by a core half part(s) 16', the latter being formed with control and sense coils 102, 104 as described generally in connection with FIG. 8. Also, although the description indicates the formation of a head part within the groove(s) of a lamination, the invention contemplates a head and the formation thereof as in FIG. 12. In FIG. 12, a head 200 is formed on an ungrooved wafer 202; and then the head is capped by, and embodied within the groove of, a protective spacer 204. Further, while integral heads are formed as in FIG. 8 and 9, it will be appreciated that the invention may be used to form separate "back" and "front" structures 206, 208—as may be preferred—so that when the tape-contacting front structure wears out, it may be replaced relatively easily.

What is claimed is:

1. Subassembly apparatus useful in the manufacture of a multitrack magnetic head comprising:
    (a) a wafer of non-magnetic material having a grooved structure thereon,
    (b) first conductive lead means disposed within said grooved structure,
    (c) magnetic film means disposed within said grooved structure over said first conductive lead means, and
    (d) second conductive lead means disposed within said grooved structure over said magnetic film means and extending about said film means to contact said first conductive lead means, the combined thickness of said magnetic film means and said first and second conductive lead means being not greater than the depth of said grooved structure.

2. The subassembly apparatus of claim 1 including nonconductive non-magnetic means surrounding said magnetic film means and said conductive lead means and filling said grooved structure.

3. The subassembly apparatus of claim 1:
   (a) wherein the grooved structure of said wafer is provided with a plurality of discrete grooves,
   (b) wherein said magnetic film means is comprised of discrete films within respective discrete grooves, and
   (c) wherein said first and second conductive lead means are comprised of respective lead means co-operative with said discrete films, whereby a plurality of said subassembly apparatus may be stacked, bonded together, and then diced into a plurality of multitrack magnetic head structures.

4. The subassembly apparatus of claim 3 including non-magnetic means surrounding respective discrete films and lead means, and filling respective discrete grooves.

5. A multitrack magnetic head comprising:
   (a) first and second stacks of non-magnetic wafers, and means bonding the wafers of said stacks together, the wafers of said stacks being provided with grooves which are so formed that, when the stacks are suitably aligned in abutting relationship, the grooves form continuous closed groove paths,
   (b) magnetic films within the grooves of said first and second wafer stacks.
   (c) coil means within at least some of said grooves and conductively coupled to the magnetic films within those grooves, the combined depthwise dimensions of said films and coil means within said grooves being less than the depth of said grooves.
   (d) means so bonding said stacks together that said grooves form said continuous closed groove paths, and
   (e) non-magnetic gap spacer means between said stacks disposed to form a high reluctance discontinuity between the magnetic films of said first and second stacks.

6. The multitrack magnetic head of claim 5 wherein the magnetic films of said first and second wafer stacks are amorphous film means.

7. The multitrack head of claim 6 wherein said amorphous film means is comprised of alternating films of magnetic and non-magnetic materials.

8. The multitrack head of claim 5 including:
   (a) non-magnetic means covering the grooves and contents thereof of at least some of said wafers, and
   (b) magnetic means covering substantially all of at least some of said non-magnetic covering means.

9. A multitrack magnetic head comprising first and second stacks of wafers of non-magnetic material, at least some of the wafers of said first stack having
   (a) lands, and a groove extending from a point on a wafer edge to another point on that edge,
   (b) first conductor means in said groove,
   (c) magnetic means in an extending the length of said groove, said magnetic means being thinner than the depth of said groove and covering said first conductor means,
   (d) second conductor means on said magnetic means and connected to said first conductor means and adapted to form therewith a coil inductively coupled to said magnetic means, at least some of the wafers of said second stack having
   (A) lands, and a groove that extends from one point on an edge thereof to another point on that edge, and,
   (B) magnetic means in and extending the length of said groove, said magnetic means being thinner than the depth of said groove, respective wafers of at least one stack thereof having non-magnetic gapping material on the particular edges of said magnetic means that reside at the edges of said wafers, and means bonding the two stacks of wafers together, the grooves of said first stack and the grooves of said second stack being so disposed with respect to each other that respective magnetic circuits are formed comprising individual magnetic means of said first and second stacks and corresponding non-magnetic gapping material.

10. The multitrack head of claim 9 wherein the magnetic means of at least one of said wafer stacks comprises an amorphous film of magnetic material.

11. The multitrack head of claim 10 wherein said magnetic means comprises alternating films of magnetic and non-magnetic material.

12. The multitrack head of claim 9 wherein at least some of the wafers of said first and second stacks have a non-magnetic coating deposited over the contents of their respective grooves, and at least some of said wafers have a magnetic coating covering substantially all of at least one of their respective faces.

13. The multitrack head of claim 9:
   (a) including cross-grooves within the grooves of wafers within said first stack,
   (b) wherein said first conductor means are deposited within said cross-grooves, and
   (c) wherein two of the cross-grooves of the respective wafers extend to the same respective edges of such wafers, whereby electrical contact to the coils of said first wafer stack may be made to the same side of said multitrack head.

* * * * *